(12) United States Patent
Langhammer

(10) Patent No.: US 8,601,044 B2
(45) Date of Patent: Dec. 3, 2013

(54) DISCRETE FOURIER TRANSFORM IN AN INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 586 days.

(21) Appl. No.: 12/715,711

(22) Filed: Mar. 2, 2010

(65) Prior Publication Data
US 2011/0219052 A1     Sep. 8, 2011

(51) Int. Cl.
 *G06F 17/14* (2006.01)
(52) U.S. Cl.
 USPC ............ 708/403; 708/404; 708/405
(58) Field of Classification Search
 USPC ............ 708/403, 404, 405
 See application file for complete search history.

(56) References Cited

U.S. PATENT DOCUMENTS

| | | | |
|---|---|---|---|
| 3,473,160 | A | 10/1969 | Wahlstrom |
| 3,800,130 | A | 3/1974 | Martinson et al. |
| 3,814,924 | A | 6/1974 | Tate |
| 4,156,927 | A | 5/1979 | McElroy et al. |
| 4,179,746 | A | 12/1979 | Tubbs |
| 4,212,076 | A | 7/1980 | Conners |
| 4,215,406 | A | 7/1980 | Gomola et al. |
| 4,215,407 | A | 7/1980 | Gomola et al. |
| 4,422,155 | A | 12/1983 | Amir et al. |
| 4,484,259 | A | 11/1984 | Palmer et al. |
| 4,521,907 | A | 6/1985 | Amir et al. |
| 4,575,812 | A | 3/1986 | Kloker et al. |
| 4,597,053 | A | 6/1986 | Chamberlin |
| 4,616,330 | A | 10/1986 | Betz |
| 4,623,961 | A | 11/1986 | Mackiewicz |
| 4,682,302 | A | 7/1987 | Williams |
| 4,718,057 | A | 1/1988 | Venkitakrishnan et al. |
| 4,727,508 | A | 2/1988 | Williams |
| 4,736,335 | A | 4/1988 | Barkan |
| 4,754,421 | A | 6/1988 | Bosshart |

(Continued)

FOREIGN PATENT DOCUMENTS

| | | |
|---|---|---|
| EP | 0 158 430 | 10/1985 |
| EP | 0 326 415 | 8/1989 |

(Continued)

OTHER PUBLICATIONS

Altera Corporation, "FIR Compiler: MegaCore® Function User Guide," version 3.3.0, rev. 1, pp. 3 11 through 3 15 (Oct. 2005).

(Continued)

*Primary Examiner* — Chuong D Ngo
(74) *Attorney, Agent, or Firm* — Ropes & Gray LLP; Jeffrey H. Ingerman

(57) ABSTRACT

Circuitry performing Discrete Fourier Transforms. The circuitry can be provided in a fixed logic device, or can be configured into a programmable integrated circuit device such as a programmable logic device. The circuitry includes a floating-point addition stage for adding mantissas of input values of the Discrete Fourier Transform operation, and a fixed-point stage for multiplying outputs of the floating-point addition stage by twiddle factors. The fixed-point stage includes memory for storing a plurality of sets of twiddle factors, each of those sets including copies of a respective twiddle factor shifted by different amounts, and circuitry for determining a difference between exponents of the outputs of the floating-point stage, and for using that difference as an index to select from among those copies of that respective twiddle factor in each of the sets.

28 Claims, 6 Drawing Sheets

(56) References Cited

U.S. PATENT DOCUMENTS

| | | |
|---|---|---|
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,912,345 A | 3/1990 | Steele et al. |
| 4,918,637 A | 4/1990 | Morton |
| 4,967,160 A | 10/1990 | Quievy et al. |
| 4,982,354 A | 1/1991 | Takeuchi et al. |
| 4,991,010 A | 2/1991 | Hailey et al. |
| 4,994,997 A | 2/1991 | Martin et al. |
| 5,068,813 A | 11/1991 | Thoen |
| 5,073,863 A | 12/1991 | Zhang |
| 5,081,604 A | 1/1992 | Tanaka |
| 5,122,685 A | 6/1992 | Chan et al. |
| 5,128,559 A | 7/1992 | Steele |
| 5,175,702 A | 12/1992 | Beraud et al. |
| 5,208,491 A | 5/1993 | Ebeling et al. |
| RE34,363 E | 8/1993 | Freeman |
| 5,267,187 A | 11/1993 | Hsieh et al. |
| 5,296,759 A | 3/1994 | Sutherland et al. |
| 5,338,983 A | 8/1994 | Agarwala |
| 5,339,263 A | 8/1994 | White |
| 5,349,250 A | 9/1994 | New |
| 5,357,152 A | 10/1994 | Jennings, III et al. |
| 5,371,422 A | 12/1994 | Patel et al. |
| 5,375,079 A | 12/1994 | Uramoto et al. |
| 5,381,357 A | 1/1995 | Wedgwood et al. |
| 5,404,324 A | 4/1995 | Colon-Bonet |
| 5,416,799 A | 5/1995 | Currivan et al. |
| 5,424,589 A | 6/1995 | Dobbelaere et al. |
| 5,446,651 A | 8/1995 | Moyse et al. |
| 5,451,948 A | 9/1995 | Jekel |
| 5,452,231 A | 9/1995 | Butts et al. |
| 5,452,375 A | 9/1995 | Rousseau et al. |
| 5,457,644 A | 10/1995 | McCollum |
| 5,465,226 A | 11/1995 | Goto |
| 5,465,375 A | 11/1995 | Thepaut et al. |
| 5,483,178 A | 1/1996 | Costello et al. |
| 5,497,498 A | 3/1996 | Taylor |
| 5,500,812 A | 3/1996 | Saishi et al. |
| 5,500,828 A | 3/1996 | Doddington et al. |
| 5,523,963 A | 6/1996 | Hsieh et al. |
| 5,528,550 A | 6/1996 | Pawate et al. |
| 5,537,601 A | 7/1996 | Kimura et al. |
| 5,541,864 A | 7/1996 | Van Bavel et al. |
| 5,546,018 A | 8/1996 | New et al. |
| 5,550,993 A | 8/1996 | Ehlig et al. |
| 5,559,450 A | 9/1996 | Ngai et al. |
| 5,563,526 A | 10/1996 | Hastings et al. |
| 5,563,819 A | 10/1996 | Nelson |
| 5,570,039 A | 10/1996 | Oswald et al. |
| 5,570,040 A | 10/1996 | Lytle et al. |
| 5,572,148 A | 11/1996 | Lytle et al. |
| 5,581,501 A | 12/1996 | Sansbury et al. |
| 5,590,350 A | 12/1996 | Guttag et al. |
| 5,594,366 A | 1/1997 | Khong et al. |
| 5,594,912 A | 1/1997 | Brueckmann et al. |
| 5,596,763 A | 1/1997 | Guttag et al. |
| 5,606,266 A | 2/1997 | Pedersen |
| 5,617,058 A | 4/1997 | Adrian et al. |
| 5,623,377 A | 4/1997 | Behrens et al. |
| 5,631,848 A | 5/1997 | Laczko et al. |
| 5,633,601 A | 5/1997 | Nagaraj |
| 5,636,150 A | 6/1997 | Okamoto |
| 5,636,368 A | 6/1997 | Harrison et al. |
| 5,640,578 A | 6/1997 | Balmer et al. |
| 5,644,519 A | 7/1997 | Yatim |
| 5,644,522 A | 7/1997 | Moyse et al. |
| 5,646,545 A | 7/1997 | Trimberger et al. |
| 5,646,875 A | 7/1997 | Taborn et al. |
| 5,648,732 A | 7/1997 | Duncan |
| 5,652,903 A | 7/1997 | Weng et al. |
| 5,655,069 A | 8/1997 | Ogawara et al. |
| 5,664,192 A | 9/1997 | Lloyd et al. |
| 5,689,195 A | 11/1997 | Cliff et al. |
| 5,696,708 A | 12/1997 | Leung |
| 5,729,495 A | 3/1998 | Madurawe |
| 5,740,404 A | 4/1998 | Baji |
| 5,744,980 A | 4/1998 | McGowan et al. |
| 5,744,991 A | 4/1998 | Jefferson et al. |
| 5,754,459 A | 5/1998 | Telikepalli |
| 5,761,483 A | 6/1998 | Trimberger |
| 5,764,555 A | 6/1998 | McPherson et al. |
| 5,768,613 A | 6/1998 | Asghar |
| 5,771,186 A | 6/1998 | Kodali et al. |
| 5,777,912 A | 7/1998 | Leung et al. |
| 5,784,636 A | 7/1998 | Rupp |
| 5,790,446 A | 8/1998 | Yu et al. |
| 5,794,067 A | 8/1998 | Kadowaki |
| 5,801,546 A | 9/1998 | Pierce et al. |
| 5,805,477 A | 9/1998 | Perner |
| 5,805,913 A | 9/1998 | Guttag et al. |
| 5,808,926 A | 9/1998 | Gorshtein et al. |
| 5,812,479 A | 9/1998 | Cliff et al. |
| 5,812,562 A | 9/1998 | Baeg |
| 5,815,422 A | 9/1998 | Dockser |
| 5,821,776 A | 10/1998 | McGowan |
| 5,825,202 A | 10/1998 | Tavana et al. |
| 5,838,165 A | 11/1998 | Chatter |
| 5,841,684 A | 11/1998 | Dockser |
| 5,847,579 A | 12/1998 | Trimberger |
| 5,847,978 A | 12/1998 | Ogura et al. |
| 5,847,981 A | 12/1998 | Kelley et al. |
| 5,859,878 A | 1/1999 | Phillips et al. |
| 5,869,979 A | 2/1999 | Bocchino |
| 5,872,380 A | 2/1999 | Rostoker et al. |
| 5,874,834 A | 2/1999 | New |
| 5,878,250 A | 3/1999 | LeBlanc |
| 5,880,981 A | 3/1999 | Kojima et al. |
| 5,892,962 A | 4/1999 | Cloutier |
| 5,894,228 A | 4/1999 | Reddy et al. |
| 5,898,602 A | 4/1999 | Rothman et al. |
| 5,931,898 A | 8/1999 | Khoury |
| 5,935,197 A | 8/1999 | Aldworth |
| 5,942,914 A | 8/1999 | Reddy et al. |
| 5,944,774 A | 8/1999 | Dent |
| 5,949,710 A | 9/1999 | Pass et al. |
| 5,951,673 A | 9/1999 | Miyata |
| 5,956,265 A | 9/1999 | Lewis |
| 5,959,871 A | 9/1999 | Pierzchala et al. |
| 5,960,193 A | 9/1999 | Guttag et al. |
| 5,961,635 A | 10/1999 | Guttag et al. |
| 5,963,048 A | 10/1999 | Harrison et al. |
| 5,963,050 A | 10/1999 | Young et al. |
| 5,968,196 A | 10/1999 | Ramamurthy et al. |
| 5,970,254 A | 10/1999 | Cooke et al. |
| 5,978,260 A | 11/1999 | Trimberger et al. |
| 5,982,195 A | 11/1999 | Cliff et al. |
| 5,986,465 A | 11/1999 | Mendel |
| 5,991,788 A | 11/1999 | Mintzer |
| 5,991,898 A | 11/1999 | Rajski et al. |
| 5,995,748 A | 11/1999 | Guttag et al. |
| 5,999,015 A | 12/1999 | Cliff et al. |
| 5,999,990 A | 12/1999 | Sharrit et al. |
| 6,005,806 A | 12/1999 | Madurawe et al. |
| 6,006,321 A | 12/1999 | Abbott |
| 6,009,451 A | 12/1999 | Burns |
| 6,018,755 A | 1/2000 | Gonikberg et al. |
| 6,020,759 A | 2/2000 | Heile |
| 6,021,423 A | 2/2000 | Nag et al. |
| 6,029,187 A | 2/2000 | Verbauwhede |
| 6,031,763 A | 2/2000 | Sansbury |
| 6,041,339 A | 3/2000 | Yu et al. |
| 6,041,340 A | 3/2000 | Mintzer |
| 6,052,327 A | 4/2000 | Reddy et al. |
| 6,052,755 A | 4/2000 | Terrill et al. |
| 6,055,555 A | 4/2000 | Boswell et al. |
| 6,064,614 A | 5/2000 | Khoury |
| 6,065,131 A | 5/2000 | Andrews et al. |
| 6,066,960 A | 5/2000 | Pedersen |
| 6,069,487 A | 5/2000 | Lane et al. |
| 6,072,994 A | 6/2000 | Phillips et al. |
| 6,073,154 A | 6/2000 | Dick |

(56) References Cited

U.S. PATENT DOCUMENTS

| | | |
|---|---|---|
| 6,075,381 A | 6/2000 | LaBerge |
| 6,084,429 A | 7/2000 | Trimberger |
| 6,085,317 A | 7/2000 | Smith |
| 6,091,261 A | 7/2000 | DeLange |
| 6,091,765 A | 7/2000 | Pietzold, III et al. |
| 6,094,726 A | 7/2000 | Gonion et al. |
| 6,097,988 A | 8/2000 | Tobias |
| 6,098,163 A | 8/2000 | Guttag et al. |
| 6,107,820 A | 8/2000 | Jefferson et al. |
| 6,107,821 A | 8/2000 | Kelem et al. |
| 6,107,824 A | 8/2000 | Reddy et al. |
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,806,733 B1 | 10/2004 | Pan et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,917,955 B1 * | 7/2005 | Botchev .................. 708/406 |
| 6,924,663 B2 | 8/2005 | Masui et al. |
| 6,959,316 B2 | 10/2005 | Parviainen |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,313,585 B2 | 12/2007 | Winterrowd |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,519,646 B2 | 4/2009 | Kaul et al. |
| 7,536,430 B2 | 5/2009 | Guevokian et al. |
| 7,567,997 B2 | 7/2009 | Simkins et al. |
| 7,587,443 B1 | 9/2009 | Langhammer |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,769,797 B2 | 8/2010 | Cho et al. |
| 7,930,335 B2 | 4/2011 | Gura |
| 7,930,336 B2 | 4/2011 | Langhammer |
| 2001/0023425 A1 | 9/2001 | Oberman et al. |
| 2001/0029515 A1 | 10/2001 | Mirsky |
| 2001/0037351 A1 | 11/2001 | Hellberg |
| 2001/0037352 A1 | 11/2001 | Hong |
| 2002/0002573 A1 | 1/2002 | Landers et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0078403 A1 | 4/2004 | Scheuermann et al. |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |

(56) References Cited

U.S. PATENT DOCUMENTS

| | | | |
|---|---|---|---|
| 2005/0187997 | A1 | 8/2005 | Zheng et al. |
| 2005/0187999 | A1 | 8/2005 | Zheng et al. |
| 2005/0262175 | A1 | 11/2005 | Iino et al. |
| 2006/0020655 | A1 | 1/2006 | Lin |
| 2007/0083585 | A1 | 4/2007 | St. Denis et al. |
| 2007/0185951 | A1 | 8/2007 | Lee et al. |
| 2007/0185952 | A1 | 8/2007 | Langhammer et al. |
| 2007/0241773 | A1 | 10/2007 | Hutchings et al. |
| 2008/0133627 | A1 | 6/2008 | Langhammer et al. |
| 2008/0183783 | A1 | 7/2008 | Tubbs |
| 2009/0172052 | A1 | 7/2009 | DeLaquil et al. |
| 2009/0187615 | A1 | 7/2009 | Abe et al. |
| 2009/0300088 | A1 | 12/2009 | Michaels et al. |
| 2010/0098189 | A1 | 4/2010 | Oketani |

FOREIGN PATENT DOCUMENTS

| | | |
|---|---|---|
| EP | 0 380 456 | 8/1990 |
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 049 025 | 11/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-068709 | 3/1992 |
| JP | 4-332036 | 11/1992 |
| JP | 5-134851 | 6/1993 |
| JP | 06-187129 | 7/1994 |
| JP | 7-135447 | 5/1995 |
| JP | 9-327000 | 12/1997 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |
| WO | WO 2010/102007 | 9/2010 |

OTHER PUBLICATIONS

Govindu, G. et al., "A Library of Parameterizable Floating-Point Cores for FPGAs and Their Application to Scientific Computing," *Proc Int'l Conf. Eng. Reconfigurable Systems and Algorithms (ERSA '05)*, Jun. 2005.

Govindu, G. et al., "Analysis of High-performance Floating-point Arithmetic on FPGAs," *Proceedings of the 18th International Parallel and Distributed Processing Symposium (PDPS'04)* pp. 149-156, Apr. 2004.

Nakasato, N., et al., "Acceleration of Hydrosynamical Simulations using a FPGA board" *The Institute of Electronics Information and Communication Technical Report CPSY2005-47*, vol. 105, No. 515, Jan. 17, 2006.

Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.

Vladimirova, T. et al., "Floating-Point Mathematical Co-Processor for a Single-Chip On-Board Computer," *MAPLD'03 Conference*, D5, Sep. 2003.

Altera Corporation, "Digital Signal Processing (DSP)," *Stratix Device Handbook*, vol. 2, Chapter 6 and Chapter 7, v1.1 (Sep. 2004).

Altera Corporation, "DSP Blocks in Stratix II and Stratix II GX Devices " *Stratix II Device Handbook*, vol. 2, Chapter 6, v4.0 (Oct. 2005).

Amos, D., "PLD architectures match DSP algorithms " *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science vol. 1896)* Aug. 27-30, 2000, pp. 456-461.

Aoki, T., "Signed-weight arithmetic and its application to a field-programmable digital filter architecture," *IEICE Transactions on Electronics* , 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," *IEE Proceedings-Vision, Image and Signal Processing*, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.

Dick, C., et al., "Configurable logic for digital communications: some signal processing perspectives," *IEEE Communications Magazine*, vol. 37, No. 8, Aug. 1999, pp. 107-111.

Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.

Gaffer, A.A., et al., "Floating-Point Bitwidth Analysis via Automatic Differentiation," *IEEE Conference on Field Programmable Technology*, Hong Kong, Dec. 2002.

Guccione, S.A.,"Run-time Reconfiguration at Xilinx," *Parallel and distributed processing: 15 IPDPS 2000 workshops*, Rolim, J., ed., May 1-5, 2000, p. 873.

Hauck, S., "The Future of Reconfigurable Systems," *Keynote Address, 5th Canadian Conference on Field Programmable Devices*, Jun. 1998, http:---.www.ee.washington.edu-people-faculty-hauck-publications-ReconfigFuture.PDF.

(56) References Cited

OTHER PUBLICATIONS

Heysters, P.M., et al., "Mapping of DSP algorithms on field programmable function arrays," *Field-Programmable Logic and Applications. Roadmap to Reconfigurable Computing. 10th International Conference, FPL 2000. Proceedings* (*Lecture Notes in Computer Science vol. 1896*), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp ORCA® FPGA Express™ Interface Manual: ispLEVER® Version 3.0, 2002.

Lucent Technologies, Microelectronics Group,"Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA " *1996 2nd International Conference on ASIC Proceedings* (*IEEE Cat. No. 96TH8140*), Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application " *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics* (*Cat. No. 99TH8465*) vol. 3 , Jul. 12-16, 1999, pp. 1522-1525.

Langhammer, M., "How to implement DSP in programmable logic " *Elettronica Oggi*, No. 266 , Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems* (*Digest*), No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+FDSP)," *Proceedings IECON '91. 1991 International Conference on Industrial Electronics, Control and Instrumentation* (*Cat. No. 91CH2976-9*) vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (*Cat. No. 00EX404*), Sep. 10-13, 2000, pp. 135-138.

Parhami, B., "Configurable arithmetic arrays with data-driven control " *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)* vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (*Cat. No. 99EX303*), Jul. 26-28,1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings* (*Lecture Notes in Computer Science vol. 1673*), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems*, 1998, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik* , vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," $3^{rd}$ *International Conference on Design and Technology of Integrated Systems in Nanoscale Era*, 6 pgs, Mar. 2008.

(56) References Cited

OTHER PUBLICATIONS

Zhou, G. et al., "Efficient and High-Throughput Implementations of AES-GCM on FPGAs," *International Conference on Field-Programmable Technology*, 8 pgs., Dec. 2007.

Altera Corporation, "Stratix II Device Handbook, Chapter 6—DSP Blocks in Stratix II Devices," v1.1, Jul. 2004.

Xilinx Inc., "Complex Multiplier v2.0", DS291 Product Specification/Datasheet, Nov. 2004.

Martinson, L. et al., "Digital matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.

Farooqui, A., et al., "General Data-Path Organization of a MAC unit for VLSI Implementation of DSP Processors," ISCAS '98, Part 2, May 31, 1998-Jun. 3, 1998, pp. 260-263.

Haynes, S.D., et al., "Configurable multiplier blocks for embedding in FPGAs," *Electronics Letters*, vol. 34, No. 7, pp. 638-639 (Apr. 2, 1998).

Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.

\* cited by examiner

DISCRETE FOURIER TRANSFORM IN AN INTEGRATED CIRCUIT DEVICE

BACKGROUND OF THE INVENTION

This invention relates to performing Discrete Fourier Transform operations in integrated circuit devices, and particularly in programmable integrated circuit devices such as programmable logic devices (PLDs).

Discrete Fourier Transforms (DFTs) are a type of Fourier transform may be used in signal processing applications to analyze the frequencies contained in a sampled signal, to solve partial differential equations, and to perform other operations such as convolutions or multiplying large integers. DFTs can be used to construct Fast Fourier Transforms (FFTs). In addition, smaller DFTs can be used to construct larger DFTs. This makes DFTs particularly useful for calculating FFTs in dedicated digital signal processing (DSP) circuit blocks in integrated circuit devices such as programmable logic devices (PLDs), because individual smaller DFTs can be computed in individual DSP blocks.

SUMMARY OF THE INVENTION

The present invention relates to reduction in the resources needed to perform a DFT operation by replacing floating-point multiplication operations with fixed-point operations. This can be done because the number of twiddle factors in a DFT calculation is relatively small, and they are within a small number of bits of each other. Therefore, instead of using floating-point multipliers to compute the DFT, fixed-point multipliers can be used. The needed precision is obtained by storing multiple copies of each twiddle factor, with each copy shifted by a different amount. The difference between the exponents of the values to be multiplied is used as an index into the twiddle factor storage to retrieve the appropriately shifted twiddle factor.

Therefore, in accordance with the present invention, there is provided circuitry for performing Discrete Fourier Transforms. The circuitry includes a floating-point addition stage for adding mantissas of input values of the Discrete Fourier Transform operation, and a fixed-point stage for multiplying outputs of the floating-point addition stage by twiddle factors. The fixed-point stage includes memory for storing a plurality of sets of twiddle factors, each of those sets including copies of a respective twiddle factor shifted by different amounts, and circuitry for determining a difference between exponents of the outputs of the floating-point stage, and for using that difference as an index to select from among those copies of that respective twiddle factor in each of the sets.

A method of configuring such circuitry on a programmable device, a programmable device so configurable, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
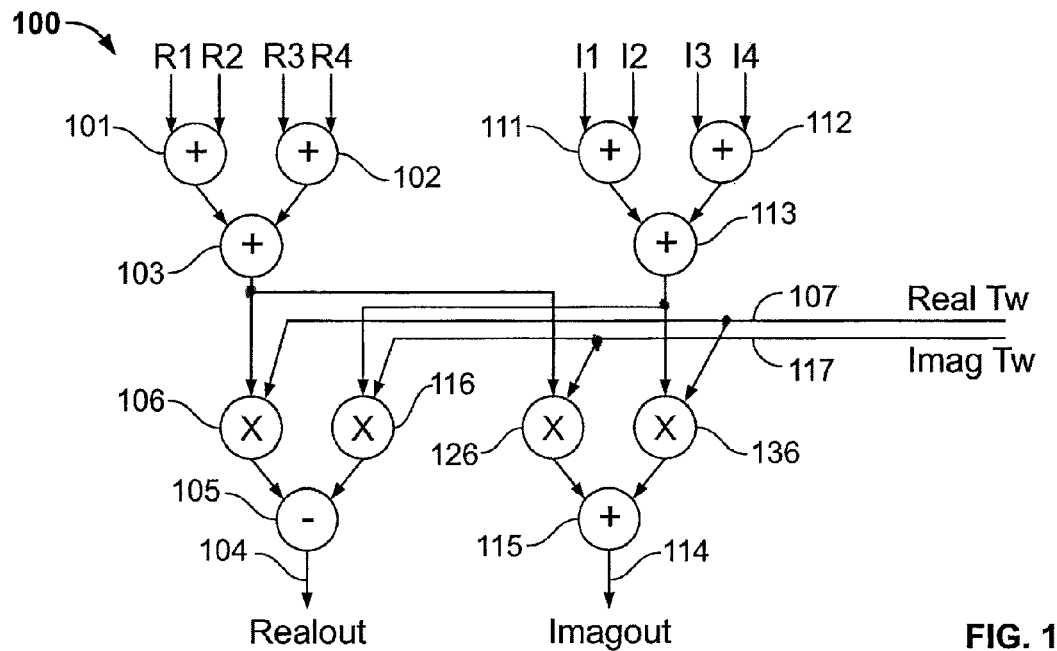
FIG. 1 shows the logical structure of a radix 4 Discrete Fourier Transform.

A radix 4 DFT has four complex inputs (R1,I1), (R2,I2), (R3,I3) and (R4,I4). As can be seen in FIG. 1, in the calculation 100 of the first bin ({1,1,1,1}), the real parts are all added together using adders 101, 102, 103 and the imaginary parts are all added together using adders 111, 112, 113. This portion of the DFT requires only adders. The real output 104 is calculated as the difference 105 between the product 106 of the real sum 103 and the real twiddle factors 107, and the product 116 of the imaginary sum 113 and the imaginary twiddle factors 117. The imaginary output 114 is calculated as the sum 115 of the product 126 of the real sum 103 and the imaginary twiddle factors 117, and the product 136 of the imaginary sum 113 and the real twiddle factors 107. Except for the multipliers 106, 116, 126, 136, the operations can be carried out using adders.

The additional bins of a radix 4 DFT are calculated by applying $\{1,-j,-1,j\}$, $\{1,-1,1,-1\}$ and $\{1,j,-1,-j\}$ to the input values. In floating-point operations, negations are easily implemented (e.g., by inverting the sign bit). Similarly, multiplication by j is accomplished by swapping the real and imaginary components of a number, which may be implemented using multiplexers as well as exclusive-OR functions. Therefore, the additional bins may be carried out with a structure similar to FIG. 1, with these additional functions added (not shown).

In the case of a radix 16 DFT, two radix 4 stages would be required. The complex multiplier on the output of the first stage would have a limited number of complex twiddle factors applied—$W_0$, $W_1$, $W_2$, $W_3$, $W_4$, $W_6$, $W_9$, where $W_x = e^{-2j\pi x/16}$.

Figure 2:
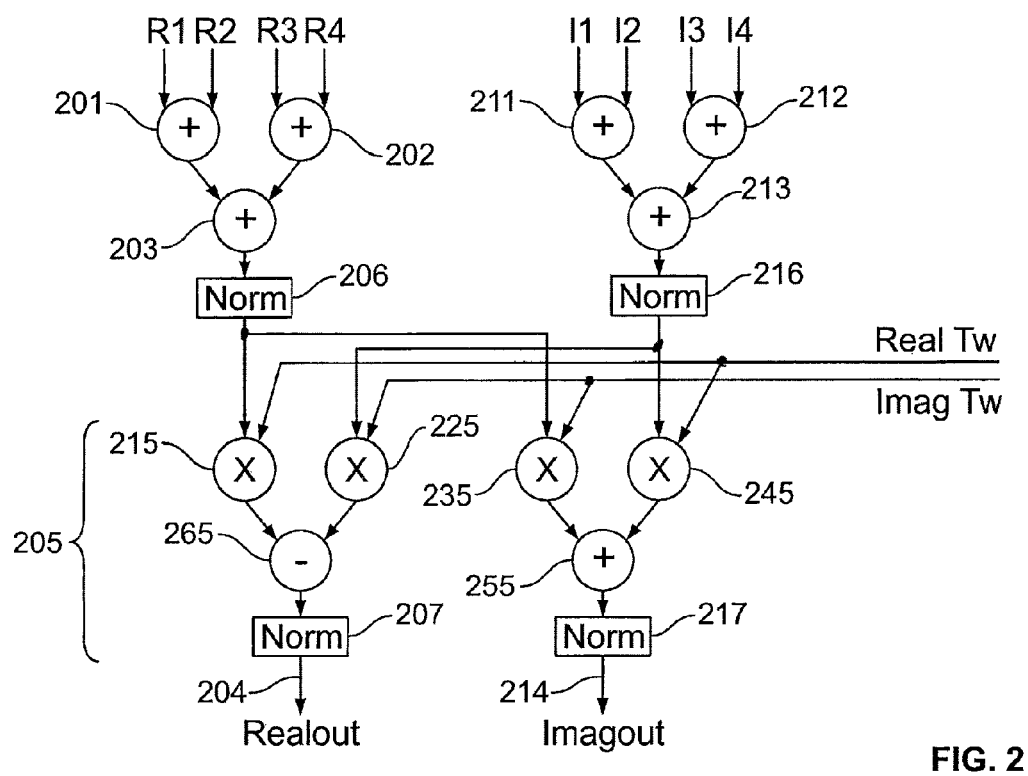
FIG. 2 shows a known improvement of the logical structure of FIG. 1.

The operators shown in FIG. 1 may be floating-point operators in accordance with the IEEE754-1985 standard for floating-point calculations. FIG. 2 shows how the computation of FIG. 1 may be computed using fewer resources by using floating-point operators as described in copending, commonly-assigned U.S. patent application Ser. No. 11/625,655, filed Jan. 22, 2007, in which floating-point numbers are maintained in unnormalized form most of the time, being normalized either (a) for output in accordance with the aforementioned IEEE754-1985 standard, or (b) where loss of precision may occur.

Thus, additions 201, 202, 203, 211, 212, 213 are floating-point operators but values are not normalized during those operations. However, the resulting sums are normalized at 206, 216 before the multiplication stage 205. Within multiplication stage 205, multipliers 215, 225, 235, 245, adder 255 and subtractor 265 are floating-point operators, but values are not normalized during those operations. However, the results are normalized at 207, 217 for output at 204, 214. This may result in a reduction in resource use of about 50% as compared to the implementation of FIG. 1.

It may be observed that after normalization blocks 206, 216, both the real and imaginary mantissas are within a factor of two or each other, although their exponents may be different. The twiddle factors for the complex multiplications before the next DFT block will likely have a small number of values as well. For example, for a radix 16 DFT having two radix 4 DFT stages, the decimal magnitudes of the values that make up the real and imaginary twiddle factors are 1, 0.9239, 0.7071, and 0.3827, which are all within two bits of each other when expressed as binary numbers.

As a result, if multipliers somewhat larger than the precision of the floating-point mantissa are available, the complex multiplications can be implemented using mostly fixed-point arithmetic, saving additional resources.

In an embodiment according to the present invention, 36-bit multipliers, which are normally used for single-precision floating-point multiplication, are available, along with memory for storage of multiple twiddle factors. In accordance with this embodiment of the invention, the twiddle factors for a DFT calculation may be converted to fixed-point numbers by storing each twiddle factor as multiple fixed-point copies shifted by different amounts. The DFT input remains the only floating-point input to the calculation. The exponent difference between the input and the twiddle factor can determined and used as an index to look up the appropriately shifted twiddle factor from the twiddle factor memory, without any loss of precision.

Figure 3:
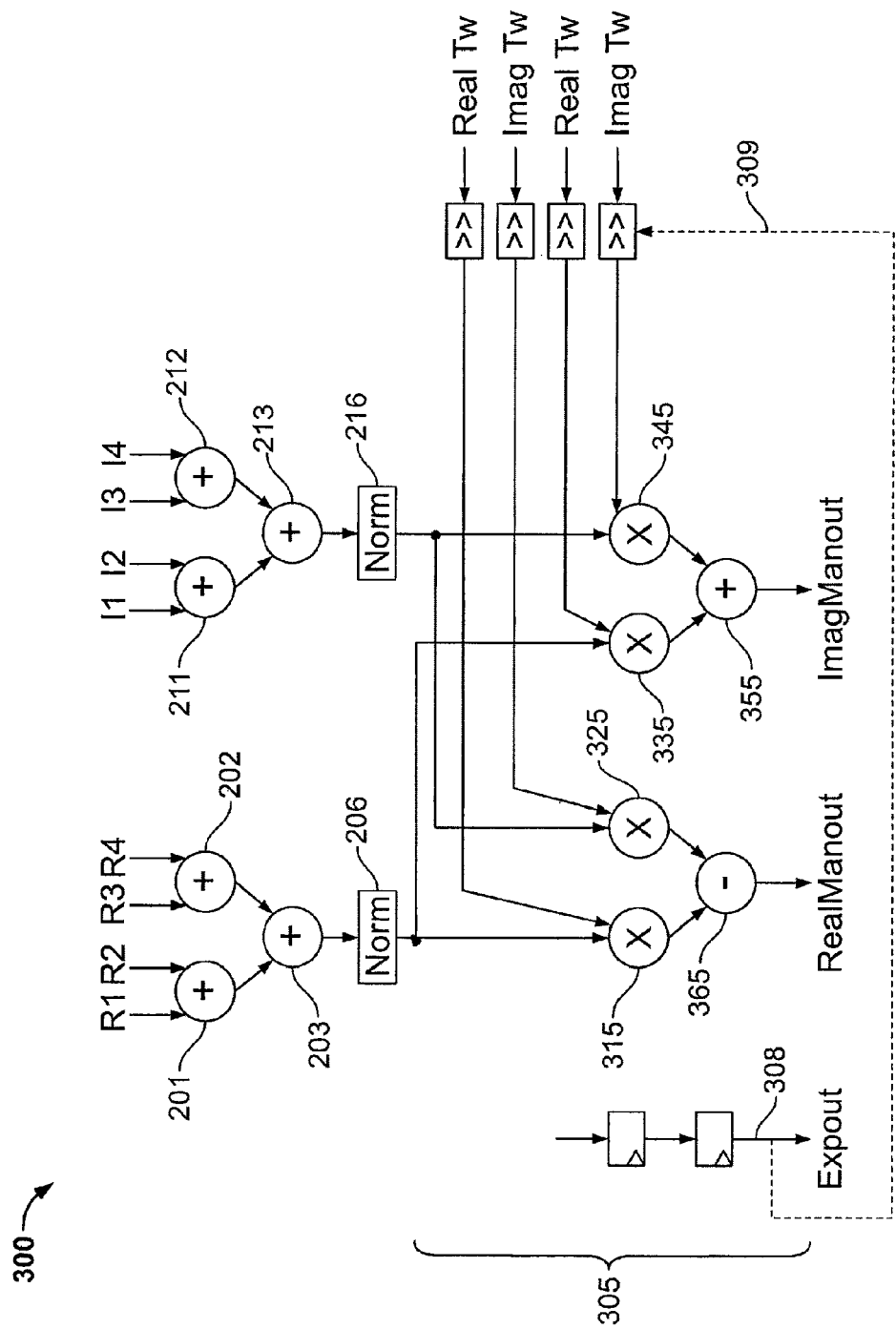
FIG. 3 shows the logical structure of a radix 4 Discrete Fourier Transform according to one embodiment of the present invention.

This logical construct 300 is shown in FIG. 3. As in the case of FIG. 2, additions 201, 202, 203, 211, 212, 213 are floating-point operators but values are not normalized during those operations. Once again, the resulting sums are normalized at 206, 216 before the multiplication stage 305. In multiplication stage 305, multipliers 315, 325, 335, 345, adder 355 and subtractor 365 are fixed-point operators. The outputs of multipliers 315, 325, 335, 345 have their relative values aligned with each other, so that they may be added or subtracted by adder 355 and subtractor 365.

Figure 4:
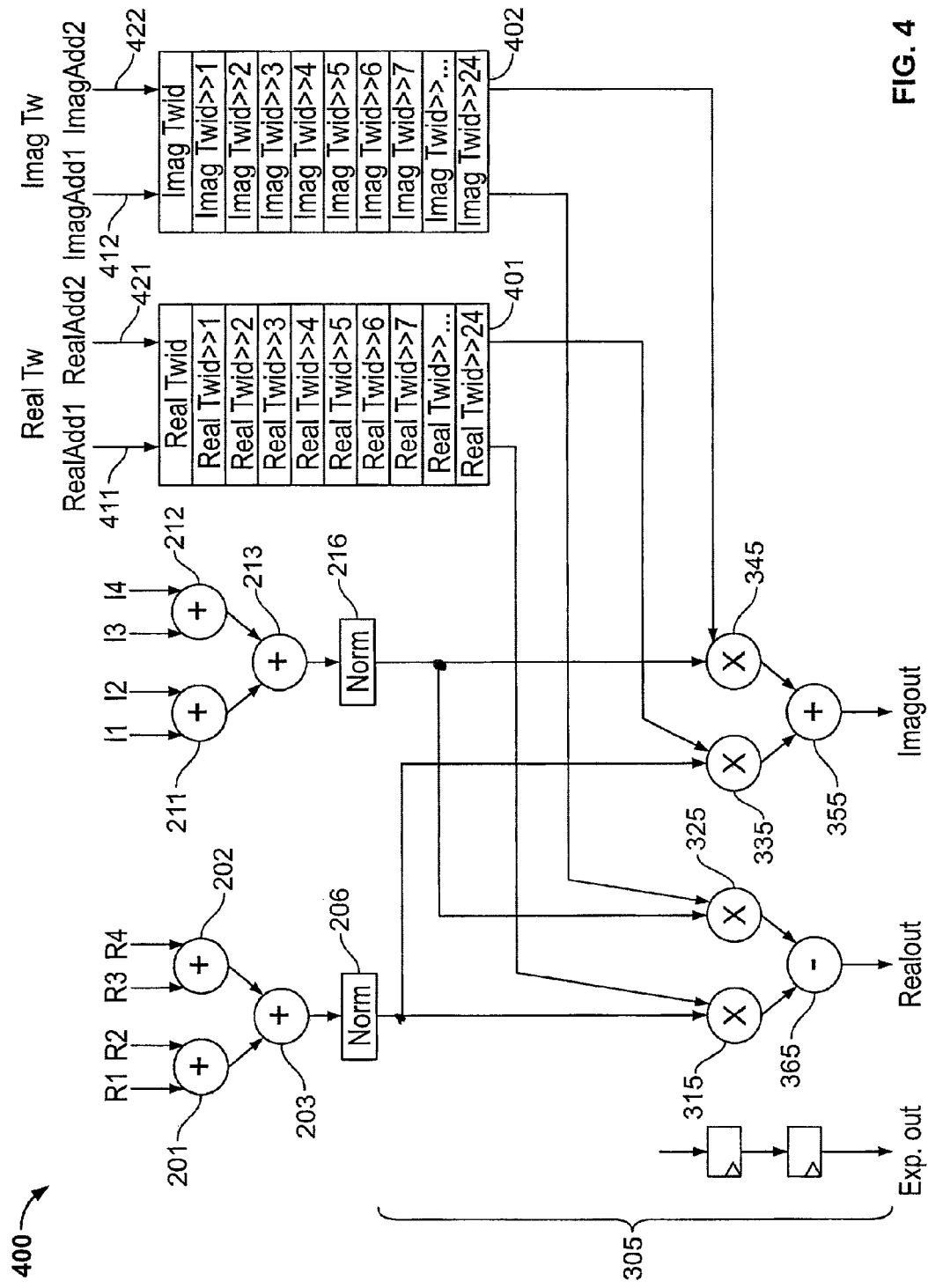
FIG. 4 is a simplified block diagram of an implementation of the logical structure of FIG. 3 according to an embodiment of the present invention.

The alignment of the multiplier outputs may be accomplished by shifting the twiddle factors. The amount of shift of each twiddle factor will be the difference between the exponents of the multiplier inputs. In one embodiment, for each multiplier pair (i.e., the pair that generates the real output and the pair that generates the imaginary output) one twiddle factor will not be shifted, and the other will be shifted. Although logically this may be represented by the shifters shown in FIG. 3, one physical implementation is shown in FIG. 4, as discussed below.

The larger output value would be a normalized data value, multiplied by a twiddle factor close to unity (i.e., within two bits magnitude of unity). Therefore, there will be a possible normalization required on the output, but in the case of a radix 16 DFT decomposed into radix 4 subsections as discussed above, there would be a maximum of 3 bits of normalization. The output exponent 308 may be calculated from the largest exponent after the normalizations 206, 216, which may be adjusted by the output mantissa normalization value. The exponent value prior to any adjustment also is used as the index to select the appropriately-shifted twiddle factors at 309.

Logical construct 300 may not save much logic, although it could reduce latency. However, a physical embodiment 400 of logical construct 300 is shown in FIG. 4. The arrangement of unnormalized floating-point adders 201, 202, 203, 211, 212, 213, normalization modules 206, 216, and fixed-point multipliers 315, 325, 335, 345, adder 355 and subtractor 365 is the same as in logical construct 300.

Memory 401 is provided for the real twiddle factors, while memory 402 is provided for the imaginary twiddle factors. Because of the limited number of twiddle factors for most large DFT constructions—e.g., 10 twiddle factors (4 of which may be unique) for the first stage in a radix 16 DFT, and 51 twiddle factors (about 35 of which may be unique) for the first stage in a radix 64 DFT, the shifts can all be precomputed and stored in memory. For example, in an integrated circuit device such as a programmable logic device from the STRATIX® family of programmable logic devices available from Altera Corporation, a sufficient number of embedded memory modules is provided on the device to serve this function. Each of memories 401, 402 may include a plurality of such embedded memory modules, as needed. However, for ease of illustration, each of memories 401, 402 is shown in FIG. 4 as a single memory module.

In the example shown, each of memories 401, 402 is a dual-port memory. Accordingly, each may be addressed by a respective pair of addresses 411, 421 and 412, 422. The members of each address pair may be considered the upper and lower portions of a single address, with lower address portion 411, 412 identifying which of the several twiddle factors is being accessed, and upper address portion 421, 422 identifying which of the shifted versions of that twiddle factor is being accessed. The generation of the addresses is performed as follows:

The real output has two multiplications—realdata×realtwiddle and imaginarydata×imaginarytwiddle. Address 1 will be used to access the real and imaginary twiddles for this case.

To calculate the real offset of Address 1 (the offset to the real twiddle memory), the exponent of the real data is subtracted from the exponent of the imaginary data. If this number is zero or positive (imaginary exponent>real exponent) then this is the offset value (and also the shift value). If this number is negative (real exponent>imaginary exponent), then this number is zeroed.

To calculate the imaginary offset of Address 1 (the offset to the imaginary twiddle memory), the exponent of the imaginary data is subtracted from the exponent of the real data. If this number is zero or positive (real exponent>imaginary exponent) then this is the offset value (and also the shift value). If this number is negative (imaginary exponent>real exponent), then this number is zeroed.

The imaginary output has two multiplications—realdata× imaginarytwiddle and imaginarydata×realtwiddle. Address 2 will be used to access the real and imaginary twiddles for this case.

To calculate the real offset of Address 2 (the offset to the imaginary twiddle memory), the exponent of the real data is subtracted from the exponent of the imaginary data. If this number is zero or positive (imaginary exponent>real exponent) then this is the offset value (and also the shift value). If this number is negative (real exponent>imaginary exponent), then this number is zeroed.

To calculate the imaginary offset of Address 2 (the offset to the real twiddle memory), the exponent of the imaginary data is subtracted from the exponent of the real data. If this number is zero or positive (real exponent>imaginary exponent) then this is the offset value (also the shift value). If this number is negative (imaginary exponent>real exponent), then this number is zeroed.

As can be seen, both the Address 1 and Address 2 calculations are the same. The real offset goes to Read Address 1 of the real twiddle memory, and to Read Address 2 of the imaginary twiddle memory. The imaginary offset goes to Read Address 2 of the real twiddle memory, and to Read Address 1 of the imaginary twiddle memory. The logic 500 for computing the real and imaginary offsets is shown in FIG. 5.

As can be seen, imaginary offset 501 is computed by subtracting at 503 the exponent 505 of the imaginary data from the exponent 506 of the real data. The result 513 is ANDed at 508 with the inverse 507 of its most significant bit 523, which zeroes result 501 if result 513 is negative. Similarly, real offset 502 is computed by subtracting at 553 the exponent 506 of the real data from the exponent 505 of the imaginary data. The result 563 is ANDed at 558 with the inverse 557 of its most significant bit 573, which zeroes result 502 if result 563 is negative.

Figures 5, 6:
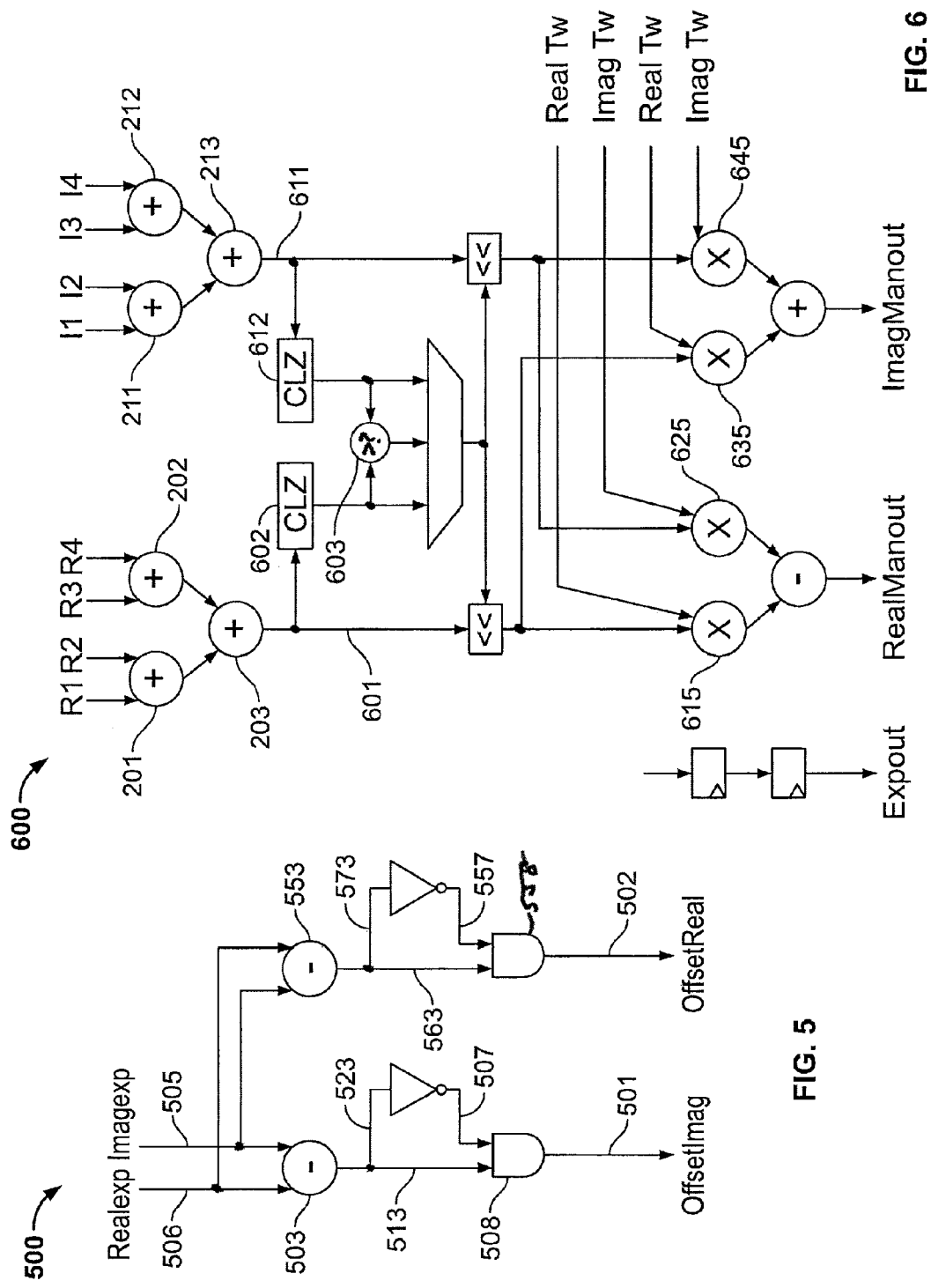
FIG. 5 is a simplified block diagram of an implementation of calculation of an address offset in connection with the implementation of FIG. 4.
FIG. 6 shows the logical structure of a radix 4 Discrete Fourier Transform according to another embodiment of the present invention.

In an alternative embodiment 600 shown in FIG. 6, instead of full normalization 206, 216 as in FIG. 4, the respective shift amounts needed to normalize real input 601 and imaginary input 611 are determined by Count Leading Zeroes modules 602, 612, and the smaller shift (i.e., the shift needed to normalize the larger of values 601, 611), as selected by comparing the leading-zero counts at 603, is used in shifters 604, 614 to left-shift both inputs 601, 611. Therefore, one of inputs 601, 611 will retain its full magnitude, but the other of inputs 601, 611 will retain only its partial magnitude. However, because, as discussed above, the twiddle factors are all of approximately the same order of magnitude, and assuming a device such as a programmable logic device from the aforementioned STRATIX® family, when multipliers 615, 625, 635, 645 are 36 bits wide, accuracy of a single-precision (23-bit mantissa) value can be maintained even if it is right-shifted.

As an example of an implementation of the present invention, consider a 1K streaming FFT. Traditionally, this would be implemented using five radix 4 stages, the first four of which will require complex multipliers. There will be 256 elements, requiring a total of thousands of twiddle factors.

Using the present invention, a 1K streaming FFT could be implemented using a radix 16 stage, a radix 4 stage and radix 16 stage. The first radix 16 stage would use an optimized internal complex multiplier, with a standard complex multiplier on the output. Alternatively, an optimized complex multiplier could be used on the output. With 64 complex twiddle factors, this would require about (32 or 36)×64=about 2,000 complex twiddle factor memory locations when all of the shifts have been pre-calculated. The next radix 4 stage could use an optimized complex multiplier, as there would only be 16 twiddle factors, or a total of about (32 or 36)×16=about 512 complex twiddle factor memory locations when all of the shifts have been pre-calculated. The final radix 16 stage would use an internal optimized complex multiplier, with about the same number of twiddle factors as the first stage.

Instructions for carrying out a method according to this invention for programming a programmable device to perform DFTs may be encoded on a machine-readable medium, to be executed by a suitable computer or similar device to implement the method of the invention for programming or configuring PLDs or other programmable devices to perform addition and subtraction operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 7:
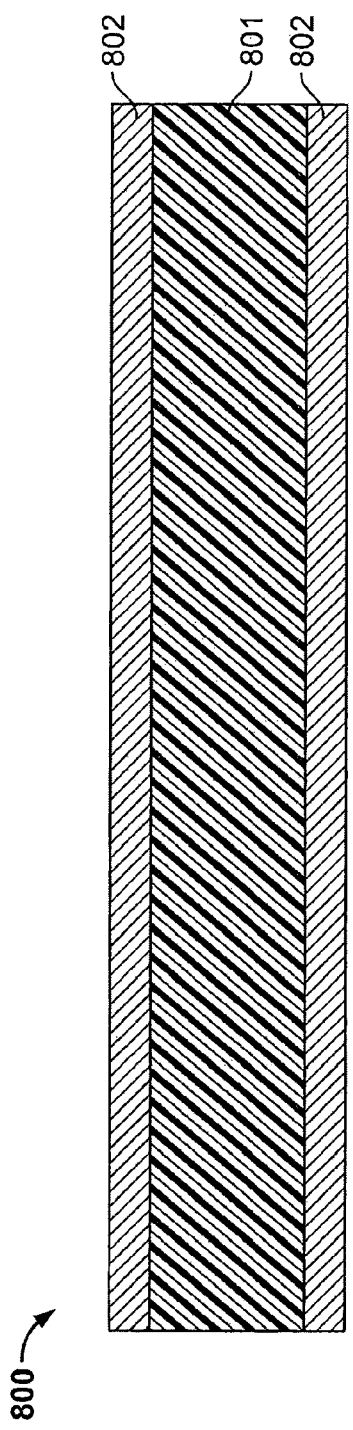
FIG. 7 is a cross-sectional view of a magnetic data storage medium encoded with a set of machine-executable instructions for performing the method according to the present invention.

FIG. 7 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 8:
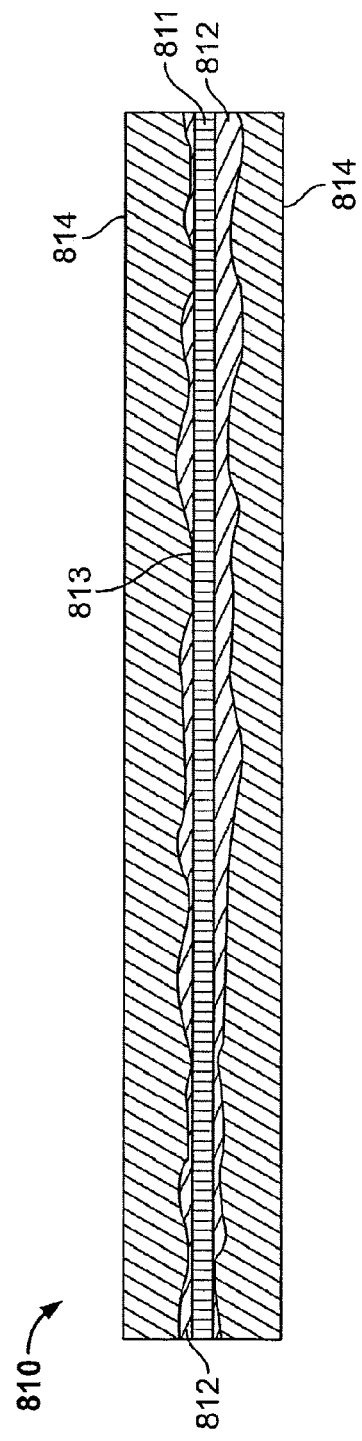
FIG. 8 is a cross-sectional view of an optically readable data storage medium encoded with a set of machine executable instructions for performing the method according to the present invention.

FIG. 8 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 9:
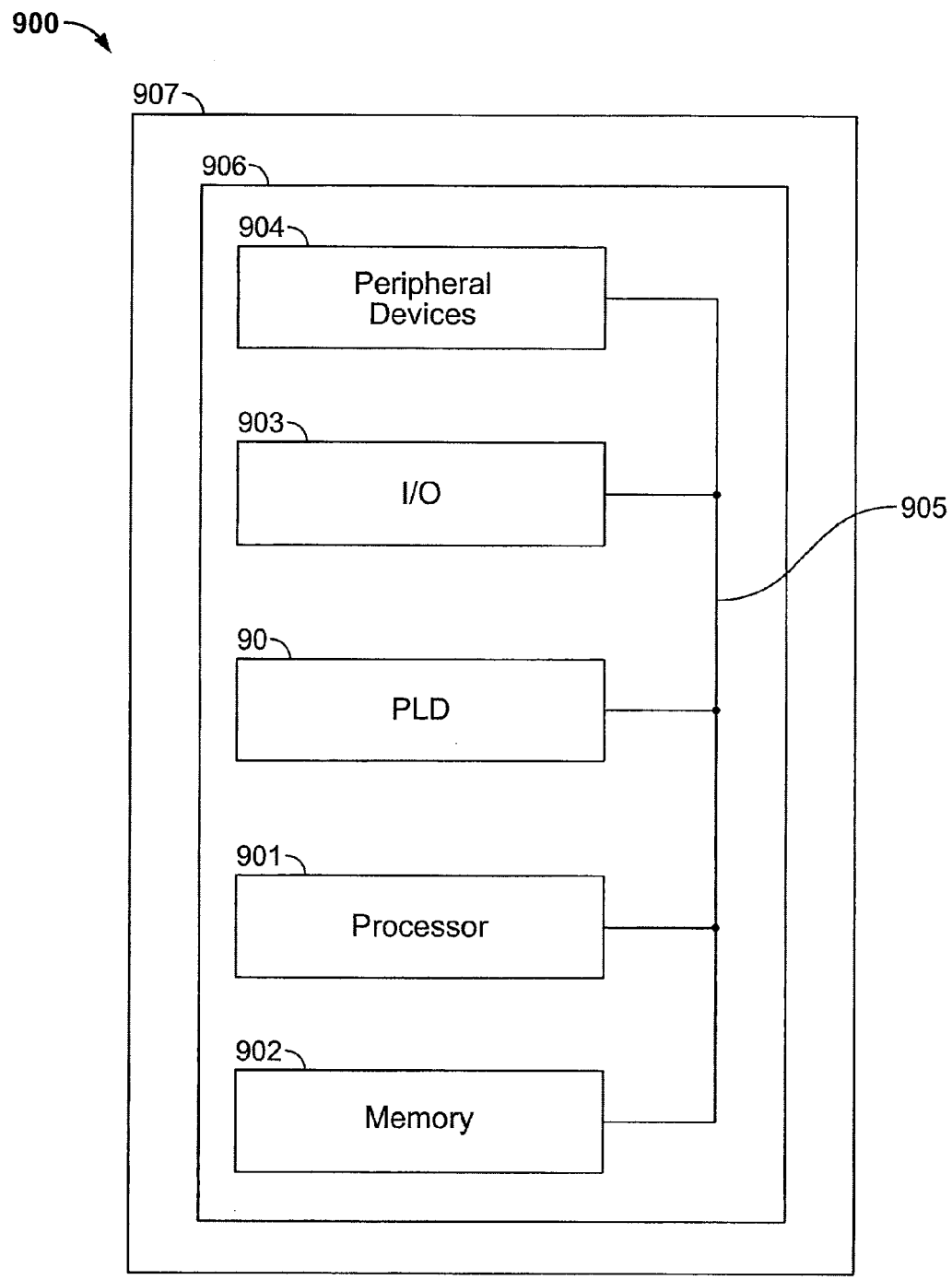
FIG. 9 is a simplified block diagram of an illustrative system employing a programmable logic device incorporating the present invention.

A PLD 90 programmed according to the present invention may be used in many kinds of electronic devices. One possible use is in a data processing system 900 shown in FIG. 9. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. Circuitry for performing a Discrete Fourier Transform operation, said circuitry comprising:
   a floating-point addition stage for adding mantissas of input values of said Discrete Fourier Transform operation; and
   a fixed-point stage for multiplying outputs of said floating-point addition stage by twiddle factors, said fixed-point stage comprising:
   memory for storing a plurality of sets of twiddle factors, each of said sets including copies of a respective twiddle factor shifted by different amounts, and
   circuitry for determining a difference between exponents of said outputs of said floating-point stage, and for using said difference as an index to select from among said copies of said respective twiddle factor in each of said sets.

2. The circuitry of claim 1 wherein said floating-point addition stage comprises at least one adder for adding real parts of said mantissas and at least one adder for adding imaginary parts of said mantissas.

3. The circuitry of claim 2 wherein:
   said at least one adder for adding real parts of said mantissas and said at least one adder for adding imaginary parts of said mantissas perform unnormalized additions; and
   said floating-point addition stage further comprises a normalization stage for normalizing unnormalized outputs of said at least one adder for adding real parts of said mantissas and at least one adder for adding imaginary parts of said mantissas.

4. The circuitry of claim 3 wherein said normalization stage comprises:
   a first normalization module for normalizing output of said at least one adder for adding real parts of said mantissas; and
   a second normalization module for normalizing output of said at least one adder for adding imaginary parts of said mantissas.

5. The circuitry of claim 3 wherein said normalization stage comprises:
   a first shifter for output of said at least one adder for adding real parts of said mantissas;
   a second shifter for output of said at least one adder for adding imaginary parts of said mantissas;
   a first count-leading-zeroes module for determining a first number of leading zeroes on output of said at least one adder for adding real parts of said mantissas;
   a second count-leading-zeroes module for determining a second number of leading zeroes on output of said at least one adder for adding imaginary parts of said mantissas; and
   a comparator for determining which of said first and second numbers of leading zeroes is smaller and for applying said smaller one of said first and second numbers of leading zeroes to each of said first and second shifters as a number of places by which said output of said at least one adder for adding real parts of said mantissas, and said output of said at least one adder for adding imaginary parts of said mantissas, are shifted.

6. The circuitry of claim 2 wherein:
   said twiddle factors include real twiddle factors and imaginary twiddle factors; and
   said fixed-point stage further comprises:
   a first multiplier for multiplying output of said at least one adder for adding real parts of said mantissas by a real twiddle factor;
   a second multiplier for multiplying output of said at least one adder for adding imaginary parts of said mantissas by an imaginary twiddle factor;
   a subtractor for subtracting output of said second multiplier from output of said first multiplier;
   a third multiplier for multiplying output of said at least one adder for adding real parts of said mantissas by an imaginary twiddle factor;
   a fourth multiplier for multiplying output of said at least one adder for adding imaginary parts of said mantissas by a real twiddle factor; and
   an adder for adding output of said fourth multiplier to output of said third multiplier.

7. The circuitry of claim 1 wherein:
   said memory comprises two-port memory storing said plurality of twiddle factors shifted by different amounts;
   a first address input of said two-port memory selects one of said respective twiddle factors; and
   said difference is a second address input of said two-port memory that selects one of said shifted copies of said one of said respective twiddle factors.

8. A method of configuring a programmable integrated circuit device as circuitry for performing a Discrete Fourier Transform operation, said method comprising:
   configuring logic of said programmable integrated circuit device as a floating-point addition stage for adding mantissas of input values of said Discrete Fourier Transform operation; and
   configuring logic of said programmable integrated circuit device as a fixed-point stage for multiplying outputs of said floating-point addition stage by twiddle factors, said fixed-point stage comprising:
   memory for storing a plurality of sets of twiddle factors, each of said sets including copies of a respective twiddle factor shifted by different amounts, and
   circuitry for determining a difference between exponents of said outputs of said floating-point stage, and for using said difference as an index to select from among said copies of said respective twiddle factor in each of said sets.

9. The method of claim 8 wherein:
   said configuring logic of said programmable integrated circuit device as a floating-point addition stage comprises configuring logic of said programmable integrated circuit device as at least one adder for adding real parts of said mantissas and at least one adder for adding imaginary parts of said mantissas.

10. The method of claim 9 wherein:
said configuring logic of said programmable integrated circuit device as at least one adder for adding real parts of said mantissas and said at least one adder for adding imaginary parts of said mantissas comprises configuring logic of said programmable integrated circuit device to perform unnormalized additions; and
said configuring logic of said programmable integrated circuit device as a floating-point addition stage comprises configuring logic of said programmable integrated circuit device as a normalization stage for normalizing unnormalized outputs of said at least one adder for adding real parts of said mantissas and at least one adder for adding imaginary parts of said mantissas.

11. The method of claim 10 wherein said configuring logic of said programmable integrated circuit device as a normalization stage comprises:
configuring logic of said programmable integrated circuit device as a first normalization module for normalizing output of said at least one adder for adding real parts of said mantissas; and
configuring logic of said programmable integrated circuit device as a second normalization module for normalizing output of said at least one adder for adding imaginary parts of said mantissas.

12. The method of claim 10 wherein said configuring logic of said programmable integrated circuit device as a normalization stage comprises:
configuring logic of said programmable integrated circuit device as a first shifter for output of said at least one adder for adding real parts of said mantissas;
configuring logic of said programmable integrated circuit device as a second shifter for output of said at least one adder for adding imaginary parts of said mantissas;
configuring logic of said programmable integrated circuit device as a first count-leading-zeroes module for determining a first number of leading zeroes on output of said at least one adder for adding real parts of said mantissas;
configuring logic of said programmable integrated circuit device as a second count-leading-zeroes module for determining a second number of leading zeroes on output of said at least one adder for adding imaginary parts of said mantissas; and
configuring logic of said programmable integrated circuit device as a comparator for determining which of said first and second numbers of leading zeroes is smaller and for applying said smaller one of said first and second numbers of leading zeroes to each of said first and second shifters as a number of places by which said output of said at least one adder for adding real parts of said mantissas, and said output of said at least one adder for adding imaginary parts of said mantissas, are shifted.

13. The method of claim 9 wherein:
said twiddle factors include real twiddle factors and imaginary twiddle factors; and
said configuring logic of said programmable integrated circuit device as a fixed-point stage further comprises:
configuring logic of said programmable integrated circuit device as a first multiplier for multiplying output of said at least one adder for adding real parts of said mantissas by a real twiddle factor;
configuring logic of said programmable integrated circuit device as a second multiplier for multiplying output of said at least one adder for adding imaginary parts of said mantissas by an imaginary twiddle factor;

configuring logic of said programmable integrated circuit device as a subtractor for subtracting output of said second multiplier from output of said first multiplier;
configuring logic of said programmable integrated circuit device as a third multiplier for multiplying output of said at least one adder for adding real parts of said mantissas by an imaginary twiddle factor;
configuring logic of said programmable integrated circuit device as a fourth multiplier for multiplying output of said at least one adder for adding imaginary parts of said mantissas by a real twiddle factor; and
configuring logic of said programmable integrated circuit device as an adder for adding output of said fourth multiplier to output of said third multiplier.

14. The method of claim 8 wherein:
said memory comprises two-port memory storing said plurality of twiddle factors shifted by different amounts;
said configuring logic of said programmable integrated circuit device as a fixed-point stage comprises configuring logic of said programmable integrated circuit device as a first address input of said two-port memory to select one of said respective twiddle factors; and
said configuring logic of said programmable integrated circuit device as a fixed-point stage comprises configuring logic of said programmable integrated circuit device to use said difference as a second address input of said two-port memory that selects one of said shifted copies of said one of said respective twiddle factors.

15. A programmable integrated circuit device comprising:
logic configurable as a floating-point addition stage for adding mantissas of input values of said Discrete Fourier Transform operation; and
logic configurable as a fixed-point stage for multiplying outputs of said floating-point addition stage by twiddle factors, said fixed-point stage comprising:
memory for storing a plurality of sets of twiddle factors, each of said sets including copies of a respective twiddle factor shifted by different amounts, and
circuitry for determining a difference between exponents of said outputs of said floating-point stage, and for using said difference as an index to select from among said copies of said respective twiddle factor in each of said sets.

16. The programmable integrated circuit device of claim 15 wherein:
said logic configurable as a floating-point addition stage comprises logic configurable as at least one adder for adding real parts of said mantissas and at least one adder for adding imaginary parts of said mantissas.

17. The programmable integrated circuit device of claim 16 wherein:
said programmable integrated circuit device as at least one adder for adding real parts of said mantissas and said at least one adder for adding imaginary parts of said mantissas comprises logic configurable to perform unnormalized additions; and
said logic configurable as a floating-point addition stage comprises logic configurable as a normalization stage for normalizing unnormalized outputs of said at least one adder for adding real parts of said mantissas and at least one adder for adding imaginary parts of said mantissas.

18. The programmable integrated circuit device of claim 17 wherein said logic configurable as a normalization stage comprises:

logic configurable as a first normalization module for normalizing output of said at least one adder for adding real parts of said mantissas; and logic configurable as a second normalization module for normalizing output of said at least one adder for adding imaginary parts of said mantissas.

19. The programmable integrated circuit device of claim 17 wherein said logic configurable as a normalization stage comprises:

logic configurable as a first shifter for output of said at least one adder for adding real parts of said mantissas;

logic configurable as a second shifter for output of said at least one adder for adding imaginary parts of said mantissas;

logic configurable as a first count-leading-zeroes module for determining a first number of leading zeroes on output of said at least one adder for adding real parts of said mantissas;

logic configurable as a second count-leading-zeroes module for determining a second number of leading zeroes on output of said at least one adder for adding imaginary parts of said mantissas; and logic configurable as a comparator for determining which of said first and second numbers of leading zeroes is smaller and for applying said smaller one of said first and second numbers of leading zeroes to each of said first and second shifters as a number of places by which said output of said at least one adder for adding real parts of said mantissas, and said output of said at least one adder for adding imaginary parts of said mantissas, are shifted.

20. The programmable integrated circuit device of claim 16 wherein:

said twiddle factors include real twiddle factors and imaginary twiddle factors; and said logic configurable as a fixed-point stage further comprises:

logic configurable as a first multiplier for multiplying output of said at least one adder for adding real parts of said mantissas by a real twiddle factor;

logic configurable as a second multiplier for multiplying output of said at least one adder for adding imaginary parts of said mantissas by an imaginary twiddle factor;

logic configurable as a subtractor for subtracting output of said second multiplier from output of said first multiplier;

logic configurable as a third multiplier for multiplying output of said at least one adder for adding real parts of said mantissas by an imaginary twiddle factor;

logic configurable as a fourth multiplier for multiplying output of said at least one adder for adding imaginary parts of said mantissas by a real twiddle factor; and logic configurable as an adder for adding output of said fourth multiplier to output of said third multiplier.

21. The programmable integrated circuit device of claim 15 wherein:

said memory comprises two-port memory storing said plurality of twiddle factors shifted by different amounts;

said logic configurable as a fixed-point stage comprises logic configurable as a first address input of said two-port memory to select one of said respective twiddle factors; and said logic configurable as a fixed-point stage comprises logic configurable to use said difference as a second address input of said two-port memory that selects one of said shifted copies of said one of said respective twiddle factors.

22. A machine-readable data storage medium encoded with machine-executable instructions for configuring a programmable integrated circuit device as circuitry for performing a Discrete Fourier Transform operation, said instructions comprising:

instructions to configure logic of said programmable integrated circuit device as a floating-point addition stage for adding mantissas of input values of said Discrete Fourier Transform operation; and instructions to configure logic of said programmable integrated circuit device as a fixed-point stage for multiplying outputs of said floating-point addition stage by twiddle factors, said fixed-point stage comprising:

memory for storing a plurality of sets of twiddle factors, each of said sets including copies of a respective twiddle factor shifted by different amounts, and circuitry for determining a difference between exponents of said outputs of said floating-point stage, and for using said difference as an index to select from among said copies of said respective twiddle factor in each of said sets.

23. The machine-readable data storage medium of claim 22 wherein:

said instructions to configure logic of said programmable integrated circuit device as a floating-point addition stage comprises instructions to configure logic of said programmable integrated circuit device as at least one adder for adding real parts of said mantissas and at least one adder for adding imaginary parts of said mantissas.

24. The machine-readable data storage medium of claim 23 wherein:

said instructions to configure logic of said programmable integrated circuit device as at least one adder for adding real parts of said mantissas and said at least one adder for adding imaginary parts of said mantissas comprises instructions to configure logic of said programmable integrated circuit device to perform unnormalized additions; and said instructions to configure logic of said programmable integrated circuit device as a floating-point addition stage comprises instructions to configure logic of said programmable integrated circuit device as a normalization stage for normalizing unnormalized outputs of said at least one adder for adding real parts of said mantissas and at least one adder for adding imaginary parts of said mantissas.

25. The machine-readable data storage medium of claim 24 wherein said instructions to configure logic of said programmable integrated circuit device as a normalization stage comprises:

instructions to configure logic of said programmable integrated circuit device as a first normalization module for normalizing output of said at least one adder for adding real parts of said mantissas; and instructions to configure logic of said programmable integrated circuit device as a second normalization module for normalizing output of said at least one adder for adding imaginary parts of said mantissas.

26. The machine-readable data storage medium of claim 24 wherein said instructions to configure logic of said programmable integrated circuit device as a normalization stage comprises:

instructions to configure logic of said programmable integrated circuit device as a first shifter for output of said at least one adder for adding real parts of said mantissas;

instructions to configure logic of said programmable integrated circuit device as a second shifter for output of said at least one adder for adding imaginary parts of said mantissas;

instructions to configure logic of said programmable integrated circuit device as a first count-leading-zeroes module for determining a first number of leading zeroes on output of said at least one adder for adding real parts of said mantissas;

instructions to configure logic of said programmable integrated circuit device as a second count-leading-zeroes module for determining a second number of leading zeroes on output of said at least one adder for adding imaginary parts of said mantissas; and instructions to configure logic of said programmable integrated circuit device as a comparator for determining which of said first and second numbers of leading zeroes is smaller and for applying said smaller one of said first and second numbers of leading zeroes to each of said first and second shifters as a number of places by which said output of said at least one adder for adding real parts of said mantissas, and said output of said at least one adder for adding imaginary parts of said mantissas, are shifted.

27. The machine-readable data storage medium of claim 23 wherein:

said twiddle factors include real twiddle factors and imaginary twiddle factors; and said instructions to configure logic of said programmable integrated circuit device as a fixed-point stage further comprises:

instructions to configure logic of said programmable integrated circuit device as a first multiplier for multiplying output of said at least one adder for adding real parts of said mantissas by a real twiddle factor;

instructions to configure logic of said programmable integrated circuit device as a second multiplier for multiplying output of said at least one adder for adding imaginary parts of said mantissas by an imaginary twiddle factor;

instructions to configure logic of said programmable integrated circuit device as a subtractor for subtracting output of said second multiplier from output of said first multiplier;

instructions to configure logic of said programmable integrated circuit device as a third multiplier for multiplying output of said at least one adder for adding real parts of said mantissas by an imaginary twiddle factor;

instructions to configure logic of said programmable integrated circuit device as a fourth multiplier for multiplying output of said at least one adder for adding imaginary parts of said mantissas by a real twiddle factor; and instructions to configure logic of said programmable integrated circuit device as an adder for adding output of said fourth multiplier to output of said third multiplier.

28. The machine-readable data storage medium of claim 22 wherein:

said memory comprises two-port memory storing said plurality of twiddle factors shifted by different amounts;

said instructions to configure logic of said programmable integrated circuit device as a fixed-point stage comprises configuring logic of said programmable integrated circuit device as a first address input of said two-port memory to select one of said respective twiddle factors; and said instructions to configure logic of said programmable integrated circuit device as a fixed-point stage comprises configuring logic of said programmable integrated circuit device to use said difference as a second address input of said two-port memory that selects one of said shifted copies of said one of said respective twiddle factors.

\* \* \* \* \*